US012725594B2

(12) United States Patent
Gabrielli et al.

(10) Patent No.: US 12,725,594 B2
(45) Date of Patent: Sep. 1, 2026

(54) ELECTRONIC MUSIC KEYBOARD

(71) Applicant: VISCOUNT INTERNATIONAL S.P.A., Mondaino (IT)

(72) Inventors: Sandro Gabrielli, Osimo (IT); Stefano Bondi, Montemarciano (IT)

( * ) Notice: Subject to any disclaimer, the term of this patent is extended or adjusted under 35 U.S.C. 154(b) by 777 days.

(21) Appl. No.: 18/253,364

(22) PCT Filed: Nov. 3, 2022

(86) PCT No.: PCT/IB2022/060601
§ 371 (c)(1),
(2) Date: May 17, 2023

(87) PCT Pub. No.: WO2023/079482
PCT Pub. Date: May 11, 2023

(65) Prior Publication Data

US 2024/0029696 A1 Jan. 25, 2024

(30) Foreign Application Priority Data

Nov. 8, 2021 (IT) ........................ 102021000028403

(51) Int. Cl.
*G10H 1/18* (2006.01)
*G10H 1/00* (2006.01)
(Continued)

(52) U.S. Cl.
CPC ........... *G10H 1/186* (2013.01); *G10H 1/0008* (2013.01); *G10H 1/14* (2013.01); *G10H 1/344* (2013.01);
(Continued)

(58) Field of Classification Search
CPC ........ G10H 1/186; G10H 1/0008; G10H 1/14; G10H 1/344; G10H 2220/221;
(Continued)

(56) References Cited

U.S. PATENT DOCUMENTS

2008/0245216 A1* 10/2008 Kojima ..................... G01P 3/50 84/688
2015/0059557 A1 3/2015 Sakata
2018/0366093 A1* 12/2018 Liu ........................ G09B 15/00

FOREIGN PATENT DOCUMENTS

CN 113611270 A 11/2021
DE 102013004467 A1 9/2014
(Continued)

OTHER PUBLICATIONS

International Search Report for corresponding PCT/IB2022/060601, dated Jan. 16, 2023.
(Continued)

*Primary Examiner* — Jeffrey Donels
(74) *Attorney, Agent, or Firm* — Egbert, McDaniel & Swartz, PLLC

(57) ABSTRACT

An electronic music keyboard having a plurality of keys, a number of magnetic sensors equal to the number of keys, a magnet disposed in each key, an A/D converter connected to each magnetic sensor, a microcontroller connected to the A/D converters and configured to receive digital values indicative of the key position and convert them into key position values and select useful key position values at which to emit sounds, a digital signal processor (DSP) connected to the microcontroller and configured to receive the useful key position values and accordingly emit at least one sound signal and an electroacoustic transducer connected to the DSP and configured to receive at least one sound signal and accordingly generate a music sound.

11 Claims, 4 Drawing Sheets

(51) Int. Cl.
*G10H 1/14* (2006.01)
*G10H 1/34* (2006.01)

(52) U.S. Cl.
CPC . *G10H 2220/221* (2013.01); *G10H 2220/271* (2013.01); *G10H 2220/275* (2013.01)

(58) Field of Classification Search
CPC ....... G10H 2220/271; G10H 2220/275; G10H 2220/521; G10H 1/0555
See application file for complete search history.

(56) References Cited

FOREIGN PATENT DOCUMENTS

| | | | | |
|---|---|---|---|---|
| EP | 1528537 A1 | | 5/2005 | |
| JP | H0439695 A | | 2/1992 | |
| JP | 2005092057 A | | 4/2005 | |
| JP | 2005321592 A | | 11/2005 | |
| WO | WO-0195308 A1 | * | 12/2001 | ............ G10H 1/346 |

OTHER PUBLICATIONS

Written Opinion of the International Searching Authority for corresponding PCT/IB2022/060601, dated Jan. 16, 2023.

* cited by examiner

| | |
|---|---|
| valor 0 | Rest position |
| valor 1 | |
| valor 2 | |
| .... | |
| valor 20 | Position 1. Contact |
| valor 21 | Position 2. Contact |
| .... | |
| valor 29 | Position 9. Contact |
| .... | |
| valor 254 | |
| valor 255 | End Stroke position |

ELECTRONIC MUSIC KEYBOARD

The present invention relates to the field of electronic music instruments, and particularly to an electronic music keyboard.

In any electronic music instruments provided with a keyboard, it is necessary to determine when the action of pressing a key on the keyboard is to be considered valid for the production of an audio signal capable of reproducing the note intended to be played. Having determined the entire mechanically permissible stroke of the key, it is necessary to determine which position of the stroke is to be associated with the generation of the note.

For certain sounds defined as "dynamic", it is necessary to adjust certain parameters of the note according to the force applied to the key. The best known and most immediate example is that of the mechanical piano. By hitting the string with less or more force, the piano hammer determines extremely different sound and acoustic characteristics. The first characteristic is notoriously the intensity of the sound. In addition to intensity, also timbre characteristics vary greatly depending on the force applied.

Other mechanical (non-electronic) music instruments, such as a mechanical pipe organ, have an interesting characteristic that results not so much from the force applied to press the key, but from the position reached by the key. In fact, in such mechanical organs, by means of a series of levers, the key opens a valve that allows the air generated by a bellows to enter the organ pipe and determine its sound.

If the key is held in such a position to open the valve incompletely, or to open the valve slowly and indecisively, an unstable harmonic sound is obtained, prolonging the "attack" status and resulting in a non-stationary sound by lengthening the phase in which the air column is not stabilized and the noisy part of the sound due to the air blowing into the pipe remains. Although such a behavior is undesirable, an electronic instrument able to simulate this defect (just like many others that are usefully simulated) would be welcomed by an organist because to some extent it would contribute to the overall realism of the performance. A virtuoso organist may even exploit such a feature to make the performance more expressive.

Another example of a real music instrument for which the keyboard covered by such a patent is advantageous is the electromechanical organ represented by the well-known Hammond organ in which a series of phonic wheels placed in front of respective pickups generates as many notes. The phonic wheels are connected to each key on the keyboard by means of controls called "drawbars". More precisely, 9 phonic wheels are connected to each key by means of 9 drawbars that individually adjust the intensity of each phonic wheel.

The inventor of the Hammond organ designed a complicated mechanism consisting of 9 switches for switching on the 9 phonic wheels connected to each key. Such a mechanism was supposed to enable the 9 phonic wheels to provide their signal all at the same instant, but this was not possible and therefore the 9 wheels are switched on in a succession determined by constructive mechanics, in a very small time span. During a typical use, it is not so easy to distinguish the temporal succession of the switching on of the phonic wheels, but, just like all defects in real instruments, such a characteristic has become a distinctive feature of this instrument. Again, the possibility of emulating such a behavior will add realism to the electronic simulation.

Currently, all electronic music keyboards are designed in the same way. One or more switches are placed under each key to detect when the key is pressed. The switches consist in conductive rubber bubbles mounted on a printed circuit board (PCB). When they are squeezed by the key, the bubbles produce a contact on the PCB. The key presses the bubble, which is deformed, touching two conductive graphite pads disposed on the PCB in such a way to activate a contact because of the conductive rubber.

A single bubble, i.e. a single switch, is used when it is simply necessary to establish the note activation event. Such a case (single contact) has now completely disappeared.

When it is necessary to establish a force applied to the key, two bubbles are used that are located at different distances and are activated at two different positions of the key stroke, that is to say at two different time moments, considering that the musician presses the key from its rest position to the end stroke position.

The greater the force applied to the key, the higher is the velocity of the key during its travel. Therefore, it is possible to associate the velocity of the key with the applied force. Consequently, by detecting the two time instants when the two contacts are closed, the time elapsed between the closure of the first contact and the closure of the second contact can be measured. Since the space traveled by the key is known, the velocity of the key can be determined, and consequently the applied force can be indirectly estimated.

Such a technique has now been improved by adopting three bubbles, that is to say three contacts, thus improving the determination of the velocity of the key, especially in the so-called repeated notes when, due to the velocity of execution it may happen that the musician presses the key again before it has returned to the rest position. In such a case the presence of the intermediate contact makes it possible to detect the movement and event, which would be lost in the case of only two contacts.

Currently there are both electronic keyboards with two contacts and with three contacts on the market. Having to determine only the activation of the note and measure the velocity of movement of the key, said electronic keyboards do not need to know the position of the key at every instant of its travel.

It must be considered that in the case where an electronic keyboard intends to emulate a pipe organ, it would be necessary to know the position of the key continuously. In fact, in a mechanical pipe organ, a skilled organist can move the key around the position that determines the opening of the valve of the pipe organ, gradually opening and closing the valve and achieving a better expressiveness in the performance of the music piece.

Similarly, if a Hammond organ with phonic wheels is to be emulated, it is necessary to know the position of the key instant by instant in order to continuously determine which of the 9 contacts of the phonic wheels are closed or open. Also in such a case, a skilled organist playing an electromechanical Hammond organ, based on the position of the key can control the opening of the 9 contacts of the phonic wheels at will so as to achieve music effects of considerable interest. Moreover, in the real Hammond organ, the opening and closing of the contacts is highly variable key by key, both in terms of the spatial position of the key and the succession of the phonic wheels that are activated.

Currently, electronic keyboards are unable to emulate such effects of a conventional pipe organ or of a conventional Hammond organ because of the missing position information, which must be detected with high spatial resolution.

JPH0439693 discloses an electronic keyboard with magnets in the keys and Hall sensors on a PCB attached to the keyboard frame. The electronics of the keypad is configured to detect only two positions of the key: the rest position and the end stroke position of the key. Evidently, a two-bit A/D converter is sufficient to detect two positions. The detection of the two positions is only used for measuring the velocity of the key. Such electronics does not provide for detecting key positions other than the rest and end stroke positions. The two states do not correspond exactly with the rest and the end stroke condition, as it is necessary to leave a margin of movement before the first contact and another margin of movement before the end stroke. This is confirmed by the fact that the magnet is mounted inside a non-linearly deformable rubber capsule, which has an initial hysteresis after which it jumps to an almost stationary position and is moved away from the sensor almost instantaneously upon the release of the key. Consequently, such a keyboard is not suitable for emulating a sound of a Hammond organ or of a pipe organ or a repeated note in a piano.

JP205092057 discloses an electronic keyboard that uses a Hall sensor-magnet coupling exclusively to detect the velocity of the key. Otherwise said, the sensor detects only two positions of the key to calculate the velocity of the key. Therefore, such a keyboard is not suitable for emulating a sound of a Hammond organ or of a pipe organ sound or finding a solution for the detection of a repeated note in a piano.

JPH0439693 and JP205092057 relate to an electronic keyboard dedicated to emulating a piano and consider the use of a magnet-sensor coupling as an improvement of the prior art based on two or three contacts made of conductive rubber. The purpose of said patents is to measure the velocity of the key as an indirect measure of the impact force of the hammer on the string, which in itself is not an exactly equivalent measure because the impact force may also be dependent on the acceleration imparted by the pianist's hand during the movement of the key. The measured velocity is an average velocity in the measurement section between two positions and is not an instantaneous velocity at the end of travel.

The purpose of the present invention is to eliminate the drawbacks of the prior art by providing an electronic music keyboard that is capable of recognizing the position of each key, instant by instant.

Another purpose is to provide such an electronic music keyboard capable of emulating the sound of mechanical (pipe organ) and electromechanical (phonic wheel organ) music instruments, in which the sound effect varies according to the position of the key.

Still another purpose of the present invention is to provide such an electronic music keyboard that is reliable and capable of generating a sound signal as faithful as possible to conventional mechanical instruments and to improve the management of repeated notes on the piano.

These purposes are achieved in accordance with the invention with the features of the appended independent claim 1.

Advantageous achievements of the invention appear from the dependent claims.

The electronic music keyboard according to the invention uses magnetic flux density sensors to detect the position of each key. A magnetic sensor is a magnetic flux density sensor (also known as magnetic induction field). Advantageously, Hall sensors are used to produce a linearly variable voltage at the output depending on an applied magnetic field.

Such sensors are relatively inexpensive, require no mechanical interaction, are long-lasting and wear-free, unlike mechanical switches. In addition, magnetic sensors are unaffected by the presence of dust, light, and humidity. Such sensors are equipped with compensation circuits for changes in sensitivity upon a temperature change.

A permanent magnet, equipped with north and south poles that must be properly located, is inserted under each key of the keyboard and a PCB is that houses a Hall sensor for each key is provided. When the key is pressed, the magnet is moved closer to the sensor, causing the magnetic induction field to increase and the sensor to produce a variable voltage at its output, the value of which is directly and linearly related to the position of the key during its travel.

Using a control microcontroller, hereafter referred to as a microcontroller, equipped with as many analog/digital acquisition lines as the sensors to be acquired, it is possible to monitor the voltage output from the various sensors placed under the keys in real time and to determine their position at any instant due to the direct proportionality between voltage and magnet position, i.e. its distance from the sensor.

The keyboard includes:

- a permanent magnet placed under each key that is moved closer to the respective sensor housed on a PCB during the movement of the key,
- an A/D conversion system equipped with as many signal lines as the sensors; and
- a microcontroller capable of managing all the signal lines to be acquired.

The microcontroller scans the signal lines at regular intervals and determines the voltage supplied by each sensor at each scanning instant; the voltage is converted into position of each individual key; the position is communicated by the microcontroller to a music signal generation system, such as a Digital Signal Processor (DSP).

Additional features of the invention will become clearer from the following detailed description, which refers to a purely illustrative and therefore non-limiting embodiment, illustrated in the accompanying drawings, wherein.

Figure 1:
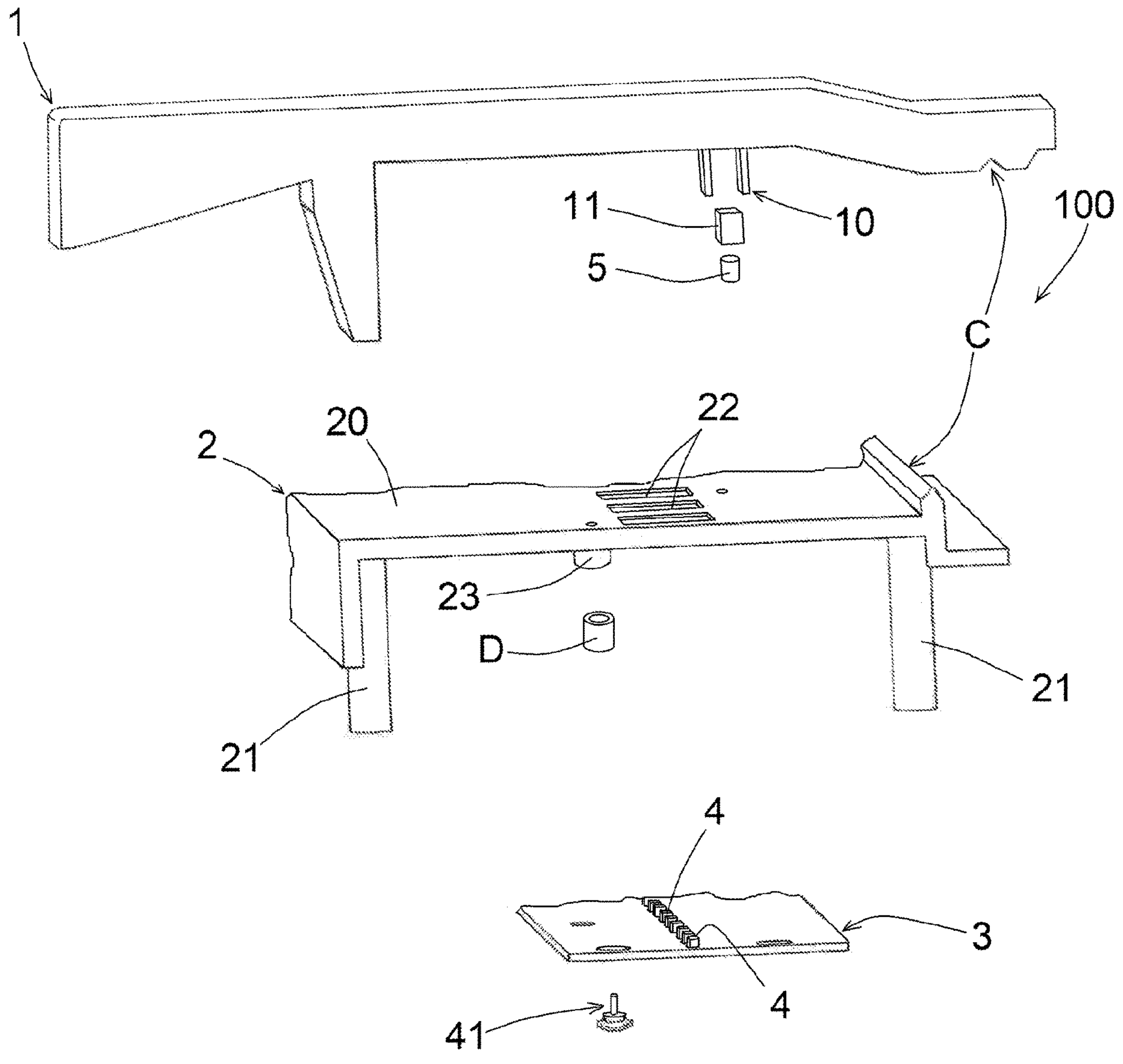
FIG. 1 is an exploded perspective view of a key, a frame and a PCB of an electronic music keyboard according to the invention.

With the help of the Figures, an electronic music keyboard according to the invention is described, it being indicated overall by the reference numeral 100.

The keyboard (100) comprises a plurality of keys (1) mounted on a frame (2). The keys (1) are hinged to the frame (2) by means of hinges (C).

Figure 2:
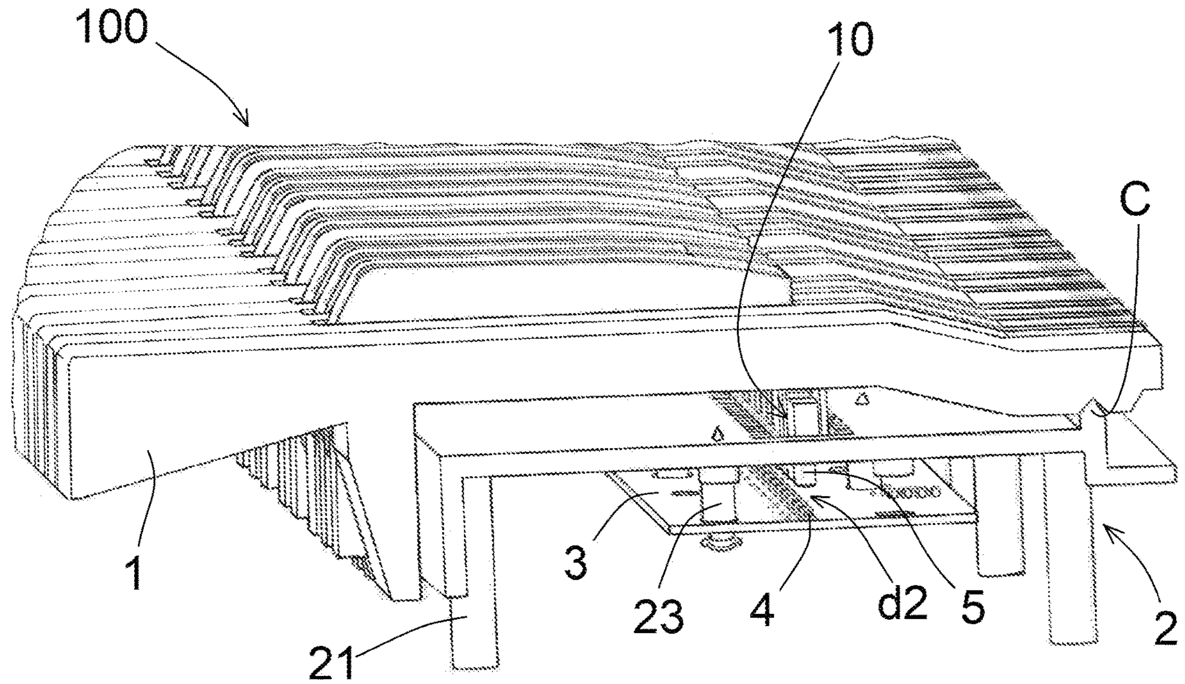
FIG. 2 is a perspective view of the assembled elements of FIG. 1, when the key is in the rest position.
Figure 3:
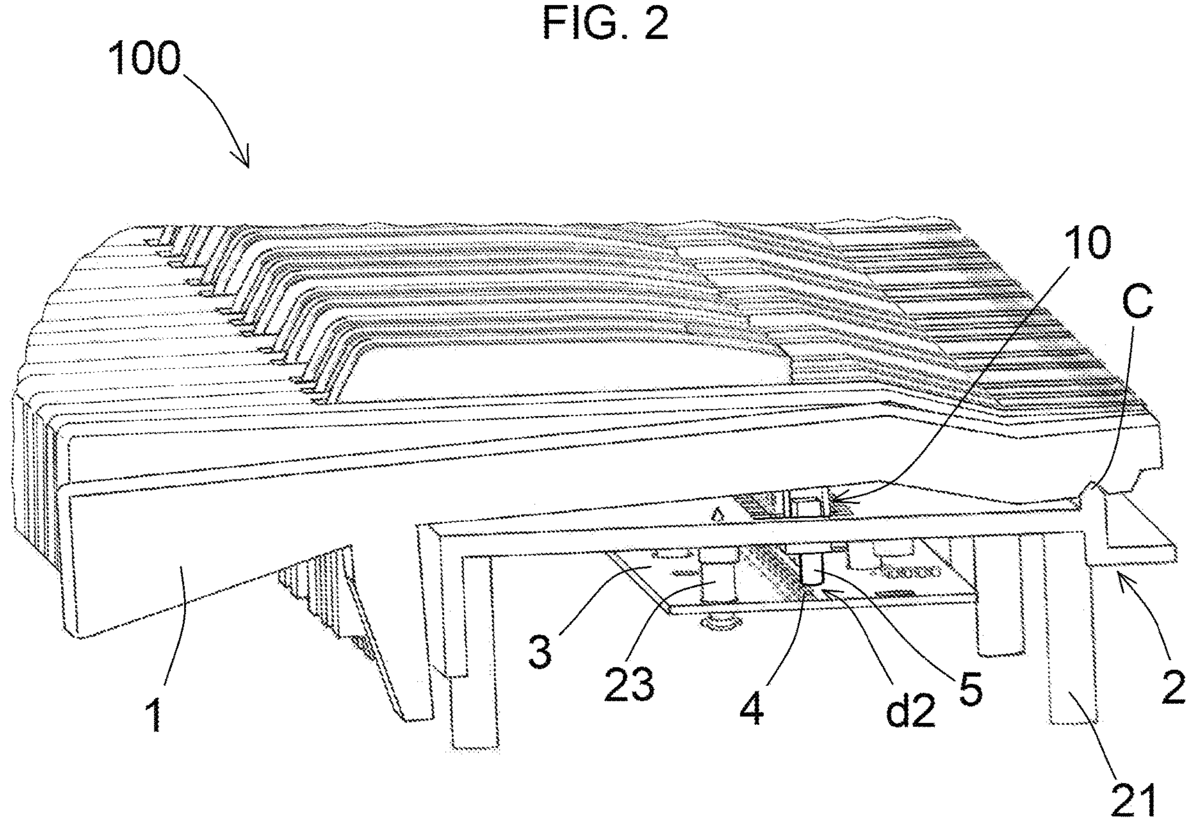
FIG. 3 is a view as FIG. 2, when the key is in the pressed end stroke position.

Spring means (of known type and therefore not illustrated) are interposed between the frame (2) and each key (1) to hold the keys in a horizontal position (FIG. 2) when the keys are in rest position. When the user presses the key (1), the key is tilted downward (FIG. 3) against the action of the spring means. When the user releases the key, the spring means bring the key back to the rest position.

According to the invention, the keyboard (100) comprises a printed circuit board (PCB) (3) on which a plurality of magnetic sensors (4) equal to the number of keys (1) on the keyboard is mounted. Each magnetic sensor (4) can be a Hall sensor. The magnetic sensors (4) are aligned along a row.

A magnet (5) having an effective magnetic pole facing a respective magnetic sensor (4) is mounted in each key (1).

When the key (1) is in rest position (FIG. 2), there is a first known distance (d1) between the magnetic sensor (4) and the magnet (5).

When the key (1) is in the end stroke position (FIG. 3), there is a second known distance (d2) between the magnetic sensor (4) and the magnet (5), which is lower than the first distance. The second distance (d2) may be small, but the magnet (5) must not contact the magnetic sensor (4) to prevent physical contact from breaking the sensor due to pressure. Precisely, one of the advantages of the electronic keyboard according to the invention is the fact that there is no physical contact between the key and the PCB.

The frame (2) comprises a plate (20) arranged on legs (21) so as to maintain itself along a horizontal plane. A plurality of through slots (22) in the shape of rectangular slots, parallel to each other and aligned along a row, are formed in the plate (20).

The PCB (3) is attached to the frame (2) under the plate (20), so that the magnetic sensors (4) of the PCB are in register with the slots (22) of the plate (20).

Spacers (D) keep the PCB (3) spaced from the plate (20) of the frame. The PCB (3) is attached to the plate (20) by means of screw means (41) that are screwed in the spacers (D) and in tangs (23) that protrude inferiorly from the plate (20).

The keys (1) are mounted above the plate (20) of the frame.

Each key (1) has a fork (10) that protrudes inferiorly and is suitable for passing through a respective slot (22) of the plate of the frame.

A support (11), for example in the shape of a parallelepiped, is fixed to the fork (10). The holder (11) is suitable for supporting the magnet (5) so that the magnet protrudes inferiorly from the support (11). The magnet (5) can have a cylindrical shape.

In this way, the effective pole of the magnet (5) of each key is located under the plate (20) of the frame, near a respective magnetic sensor (4).

Figure 4:
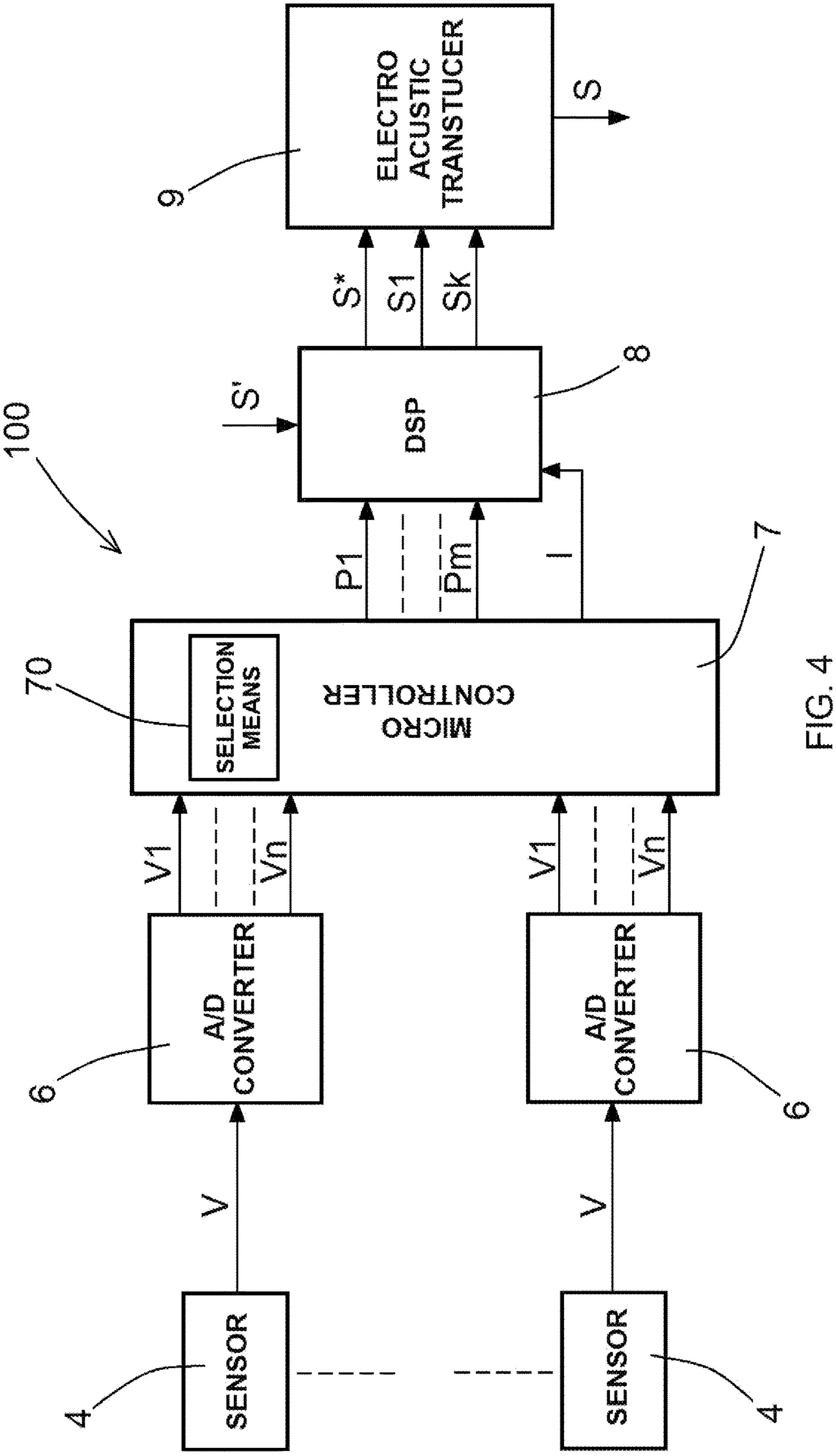
FIG. 4 is a block diagram illustrating a signal processing of the electronic music keyboard according to the invention.

With reference to FIG. 4, each magnetic sensor (4) generates a voltage signal (V) at the output, which is of analog type, and inversely proportional to the distance between the magnet (5) and the magnetic sensor (4); that is to say, the voltage signal (V) varies from a minimum value when the key (1) is in the rest position, to a maximum value when the key (1) is in the end stroke position.

When the key (1) is moved downwards, the magnet (5) is moved closer to the magnetic sensor (4), which produces a voltage change at its ends. The analog voltage signal (V) from each magnetic sensor (4) is continuously digitized by means of a respective analog-to-digital (A/D) converter (6), which generates digital values (V1, . . . Vn) of the voltage signal generated by the sensor as an output.

Each A/D converter (6) is connected to a microcontroller (7) that receives the digital values (V1, . . . Vn) of the voltage signal (V) detected by each sensor (4) and converts them into position values indicative of the position of the key.

A/D converters (6) must be at least 8-bit converters in order to have sufficient resolution of the voltage and consequently of the position for the purposes to be achieved.

In the case of an 8-bit A/D converter, the microcontroller (7) will be able to convert 256 key position values from the rest position to the end stroke position. Therefore, the key positions can be divided into 256 positions from the rest position to the end stroke position The microcontroller (7) comprises selection means (70) according to the type of music instrument to be emulated. From among the possible 256 key position values, the selection means (70) select a plurality of useful key positions values (P1, . . . Pm) indicative of useful positions of the key (1) in which certain sound signals are to be activated according to the music instrument to be emulated, and thus exclude the other key position values that do not correspond to the useful positions. Each useful key position value (P1, . . . Pm) is associated with a certain sound signal (S*, S1 . . . Sk) according to the instrument to be emulated or an appropriate parameterization of the computational synthesis model of the music signal.

Thus, during the use of the keyboard (100), when a key (1) reaches a useful position, the microcontroller (7) outputs the corresponding useful key position value (P1, . . . Pm) associated with a corresponding sound signal (S*, S1 . . . Sk) to be emitted.

The microcontroller (7) is connected to a digital signal processor (DSP) (8) suitable for modifying a synthesized sound signal (S') according to the useful key position values (P1, . . . Pm) sent by the microcontroller (7). The synthesized sound signal (S') is generated by a synthesis algorithm (of known type and therefore not illustrated) according to the type of instrument to be emulated.

Then, depending on the position of the keys, the DSP (8) modifies the synthesized signal (S') and generates a modified sound signal (S*) that is sent to an electroacoustic transducer (9) that generates a music sound (S).

Figures 5, 6:
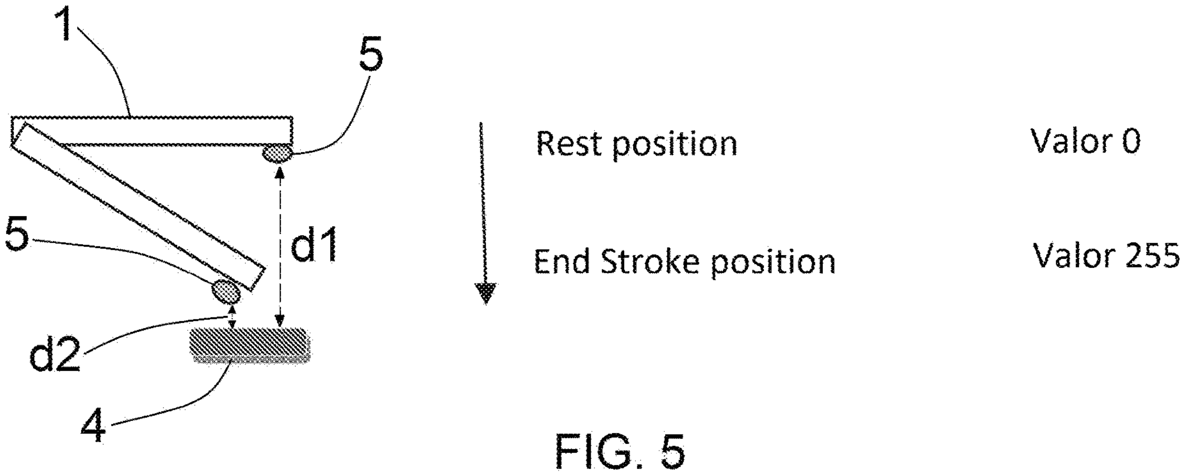
FIG. 5 is a schematic view of a key, illustrating a travel of the key from a rest position to an end stroke position and a breakdown of the voltage range into 256 values when using an 8-bit A/D converter.
FIG. 6 is a table illustrating a possible selection of nine useful key positions.

With reference to FIG. 5, assuming that an 8-bit A/D converter (6) is used, 256 levels are possible between a minimum voltage value (value 0) and a maximum voltage value (value 255), corresponding to as many key positions between the rest position and the end stroke position.

The A/D converter (6) of each sensor is controlled by the microcontroller (7) which activates and commands the A/D conversions at regular time intervals. So, with an adequate time resolution, the microcontroller (7) knows the position of the key (1) at each time instant. From among the various positions of the key, ranging from the rest position to the end stroke position, the microcontroller (7) selects some useful key position values (P1, . . . Pm) and communicates them to the DSP (8), which modifies the synthesized sound signal (S') and generates the modified sound signal (S*) to be sent to the electroacoustic transducer (9) according to the useful positions selected by the microcontroller.

With reference to FIG. 6, the space traveled by the key (1) can be divided into 256 positions from value 0 to value 255. In the case where the keyboard (100) is to emulate the sound of a Hammond organ, the DSP (8) is not configured to modify the synthesized sound signal, but it is configured to output nine sound signals (S1, . . . S9) of synthesized type for each key of the keyboard, corresponding to the sound of nine phonic wheels of a conventional Hammond organ.

In such a case, therefore, only nine specific useful key positions need to be considered, that is to say a number of useful positions equal to the number of phonic wheels to be activated. For instance, only one area of the key travel may be considered, corresponding to values 20 to 29, which is useful for triggering a sound equivalent to the sound produced by nine phonic wheels associated with that particular key. The area to be considered, the sequence of wheels to be activated, and the distance between values can be determined as desired on a key-by-key basis, as long as the position detection resolution permits.

When the microcontroller (7) which controls the A/D converter (6) detects that the useful key positions 1 to 9 have been reached, the microcontroller (7) informs the DSP (8), which will activate an electronic sound that simulates the sound generated by the phonic wheels of a mechanical Hammond organ that would have been activated at that moment.

If the musician presses the key downwards, the DSP (8) generates sound signals corresponding to the activated phonic wheels. Otherwise said, when the key reaches position 1, the sound signal (S1) corresponding to the sound of the phonic wheel 1 is activated; when the key reaches position 2, the sound signals (S1, S2) corresponding to the sound of the phonic wheel 1 and of the phonic wheel 2 are activated, and so on until the key reaches position 9, where sound signals (S1, . . . S9) corresponding to the sound of all nine phonic wheels are activated. If the key continues to move downwards beyond position 9, the sound signals (S1, . . . S9) corresponding to the sound of all nine phonic wheels remain activated.

On the other hand, if the musician releases the key or otherwise moves the key back upwards, once the key reaches position 9, the sound of some or all of the phonic wheels will be gradually deactivated.

The microcontroller (7) informs the DSP (8) of the activation state of the phonic wheels with an appropriate time frequency and based on the information received from the microcontroller (7) the DSP will generate sound signals related to the activated phonic wheels.

In order to emulate a pipe organ, the DSP (8) must be configured to modify the synthesized sound signal (S') to simulate different degrees of opening of a pipe organ valve depending on the position of the key.

In such a case, several separate sound signals are not generated, and the only synthesized signal (S') is modified according to the position of the key. For instance, the physical generation model of the modified sound can consider the position to modulate the attack noise or to modify the amplitude or to modulate other parameters of the physical model.

In this case, the key positions useful for the sound generation can be taken according to the type of organ pipe to be emulated.

In the case where the keyboard (100) is to emulate a piano, the DSP (8) is configured to modify the synthesized signal (S') and generate a modified sound signal (S*) according to the pressure exerted on the key.

Considering that the microcontroller (7) knows the time it takes for the key to move from one position to the next position, the microcontroller (7) can calculate velocity values (I) of the key, such as a total velocity of the key from the rest position (value 0) to the end stroke position (value 255) or a partial velocity of the key from any position to the end stroke position. Since the velocity values (I) of the key are proportional to the pressure exerted on the key, the piece of information on the partial velocity of the key is important in order to simulate what are known as "repeated notes" in an extremely accurate way. The velocity values (I) are sent from the microcontroller (7) to the DSP (8) so that the DSP generates sound signals based on the velocity values of the key that are indicative of the pressure exerted on the key, with greater accuracy than the prior art. Due to the linearity of the voltage with respect to the key position, the difference between two consecutive voltage values corresponds to equal distances in the position of the key. Therefore, the measurement time between any two positions corresponds to a correct velocity evaluation.

The invention also relates to a signal processing method for an electronic music keyboard (100).

The method comprises the following steps:

division of the positions of each key of the keyboard into at least 256 positions, between a rest position and an end stroke position, selection of a plurality of useful positions from among said at least 256 key positions, association of sound signals (S*; S1, . . . Sk) to said selected useful positions, according to the music instrument to be emulated, with differentiated detection also on a key-by-key basis;

detection of the position of each key while using the keyboard, emission of the sound signal (S*; S1, . . . Sk) associated with the detected useful key position, and emission of the music sound (S) according to the sound signal (S*; S1, . . . Sk) emitted.

Equivalent variations and modifications may be made to the present embodiment of the invention, within the scope of a person skilled in the art, but still within the scope of the invention as expressed by the appended claims.

The invention claimed is:

1. An electronic music keyboard comprising:

a plurality of keys;

a plurality of magnetic sensors equal in number to a number of said plurality of keys;

a permanent magnet disposed in each key of said plurality of keys, said permanent magnet having a magnetic pole facing a respective magnetic sensor of said plurality of magnetic sensors so as to move closer to or away from the magnetic sensor in relation to a movement of the key, each magnetic sensor of said plurality of magnetic sensors being configured to output an analog voltage signal inversely proportional to a distance between the magnetic and the magnetic sensor;

an analog-to-digital converter connected to each magnetic sensor of said plurality of magnetic sensors so as to digitize the analog voltage signal generated by the magnetic sensor and to output a plurality of digital values indicative of a position of the key;

a microcontroller connected to said analog-to-digital converter and configured to receive the plurality of digital values indicative of the position of the key and to convert the plurality of digital values into key position values;

a digital signal processor connected to said microcontroller so as to generate at least one sound signal; and an electroacoustic transducer connected to said digital signal processor and configured to receive the at least one sound signal and to generate a musical sound, wherein said analog-to-digital converter is at least an 8-bit converter adapted to provide at least 256 digital values indicative of the position of the key, said microcontroller being configured to convert the at least 256 digital values from said analog-to-digital converter into the at least 256 key position values respectively varying from a rest position to an end stroke position, wherein said microcontroller has a selector, the selector corresponding to a type of musical instrument to emulate, the selector being configured to select a plurality of useful key position values from the 256 key position values associated with respective sound signals of the at least one sound signal in relation to the type of musical instrument to emulate, said microcontroller being configured to output a useful key position value corresponding to the key position when using the electronic music keyboard, wherein said digital signal processor is configured to receive the useful key position value emitted by said microcontroller and to emit the sound signal corresponding to the useful key position value to said electroacoustic transducer emitting the musical sound.

2. The electronic music keyboard of claim 1, wherein each magnetic sensor of said plurality of magnetic sensors is a Hall sensor.

3. The electronic music keyboard of claim 1, wherein said plurality of magnetic sensors are mounted on a printed circuit board disposed under a plate of a frame upon which said plurality of keys are mounted.

4. The electronic music keyboard of claim 1, wherein said plurality of magnetic sensors are positioned on the printed circuit board so as to be aligned along a row.

5. The electronic music keyboard of claim 3, wherein the plate has a plurality of through slots disposed in parallel relation and aligned along a row, the printed circuit board being fixed to the frame under the plate such that said plurality of magnetic sensors are in register with the plurality of through slots of the plate.

6. The electronic music keyboard of claim 5, wherein each key of said plurality of keys has a fork, a support being in the fork so as to support said permanent magnet, the fork protruding inferiorly from the key so as to cross a respective through slot of the plurality of through slots of the plate.

7. The electronic music keyboard of claim 3, further comprising:

a plurality of spacers disposed between the printed circuit board and the plate of the frame so as to keep the printed circuit board spaced from the plate of the frame.

8. The electronic music keyboard of claim 1, wherein said digital signal processor is configured to output nine sound signals for each key of said plurality of keys, the nine sound signals corresponding to a sound of nine phonic wheels of a Hammond organ.

9. The electronic music keyboard of claim 1, wherein said digital signal processor is configured to modify a synthesized sound signal in accordance with the useful key position values sent by said microcontroller and to generate a modified sound signal that is sent to said electroacoustic transducer.

10. The electronic music keyboard of claim 9, wherein the synthesized sound signal is a sound signal of a pipe organ that is modifiable according to opening degrees of a valve of the pipe organ based on the position of each key of said plurality of keys.

11. The electronic music keyboard of claim 1, wherein said microcontroller is configured to detect key velocity values as a space traveled by the key between two key positions divided by a time taken by the key to travel the space and to send the key velocity values to said digital signal processor, said digital signal processor being configured to receive the key velocity value of the key and to modify a synthesized sound signal to output a modified sound signal based on the key velocity value that is indicative of a pressure exerted on the key.

* * * * *